United States Patent [19]

Minowa et al.

[11] Patent Number: 5,055,356
[45] Date of Patent: Oct. 8, 1991

[54] ALUMINIUM AND ALUMINIUM ALLOY HAVING CORROSION-RESISTANT PROTECTIVE LAYER, AND METHODS OF MAKING SUCH A LAYER

[75] Inventors: Emiko Minowa, Tohkai; Shiro Kobayashi, Hitachi; Masahiko Itoh, Hitachiohta, all of Japan

[73] Assignee: Hitachi, Ltd., Tokyo, Japan

[21] Appl. No.: 386,218

[22] Filed: Jul. 28, 1989

[30] Foreign Application Priority Data

Jul. 28, 1988 [JP] Japan ................................ 63-188856

[51] Int. Cl.$^5$ ................................................ B37B 9/00
[52] U.S. Cl. ..................................... 428/409; 428/457; 428/913; 428/64; 428/65; 204/33; 204/58; 346/76 L; 346/135.1; 369/288
[58] Field of Search ..................... 357/70; 428/457, 64, 428/65, 913, 901, 409; 369/288, 272; 346/76 L, 135.1; 204/33, 58

[56] References Cited

U.S. PATENT DOCUMENTS

| | | | |
|---|---|---|---|
| 3,615,888 | 10/1971 | Wystrach | 148/6.14 R |
| 3,615,889 | 10/1971 | Rauch | 148/6.14 R |
| 4,431,268 | 2/1984 | Ohno et al. | 428/631 |
| 4,457,598 | 7/1984 | Shimabukuro et al. | 428/631 |
| 4,507,179 | 3/1985 | Yoshida | 204/58 |
| 4,578,156 | 3/1986 | Plazter | 204/33 |

OTHER PUBLICATIONS

Industrial & Engineering Chemistry, Product Research & Development, vol. 25, No. 2, 6/86, Corrosion Inhibitor Orientation on Steel, Salensky et al.
Chemical Abstracts, vol. 107, No. 6, Aug. 1987, p. 558, Abs. No. 48253q, Columbus Ohio.

*Primary Examiner*—Patrick J. Ryan
*Attorney, Agent, or Firm*—Antonelli, Terry, Stout & Kraus

[57] ABSTRACT

A body, particularly a thin layer, of aluminium or aluminium alloy is given a corrosion-resistant bright dense barrier-type protective layer. The layer has a thickness in the range 50 to 500 nm and comprises aluminium oxide and a chelate complex of aluminium and at least one organic chelating compound. The layer is formed by contacting the surface with a solution of the chelating compound of pH 2 to 7 and, optionally, performing oxidative electrolysis.

29 Claims, 6 Drawing Sheets

ALUMINIUM AND ALUMINIUM ALLOY HAVING CORROSION-RESISTANT PROTECTIVE LAYER, AND METHODS OF MAKING SUCH A LAYER

BACKGROUND OF THE INVENTION

1. Field of the Invention

This invention relates to aluminium and aluminium alloy bodies having corrosion-resistant protective layers and to methods of making such layers. The invention is especially, though not exclusively, applicable to such bodies in the form of thin aluminium or aluminium alloy layers, and the coating provided by the invention particularly improves the moisture resistance of such thin layers. Thus the invention is particularly useful when applied to thin aluminium or aluminium alloy layers in optical information recording members and to electronic devices having thin wiring or electrode layers formed of aluminium or aluminium alloy.

2. Description of the Prior Art

It has long been known that aluminium is protected against corrosion, e.g. by water, by the formation of a corrosion-resistant alumina layer at its surface. Such a layer is formed by exposure to air. In a structure used in a building, for example an aluminium window or roof, this layer has typically a thickness of 100 μm and provides excellent corrosion resistance. Obviously, a layer of this kind cannot be used to protect a very thin aluminium body, particularly a thin aluminium layer of thickness of the order of 1-10 μm or less, such as is nowadays used in optical information-storage discs and electronic devices.

The surface treatment of aluminium by electrolytic treatment in organic and inorganic salt solutions has long been known and involves oxidation of the aluminium per se. It is possible to improve the corrosion resistance, if an oxide coating on the surface of aluminium can be formed in larger thickness by a surface treatment technique, but the thickness of the aluminium restricts this. Further, addition of an organic reagent to an electrolytic bath enables a further improvement in the corrosion resistance reliability of aluminium. This is because a porous coating formed by an electrolytic treatment exhibits a remarkable activity by virtue of its very large surface area and adsorbs an organic reagent to form a stable protective coating.

One method of surface treatment through electrolytic treatment in a solution containing an organic chelating agent is described in JP-A-62-80294. 8-hydroxyquinoline (oxine) is added to an aqueous sulphuric acid solution. This is taken to be strong acid solution (pH<1). The articles treated according to this document are building materials, e.g. windows, and the oxide layer produced will have a thickness of more than 100 μm, as in conventional oxidation.

U.S. Pat. No. 4563253 is concerned with making corrosion-inhibited metal by first forming a thin oxide coating on the metal and then electrolytically treating the oxidized metal in a bath containing an organic complexing compound. Many chelating compounds, e.g. oxine, are disclosed. The process is especially applied to iron and steel substrates. Other metals mentioned are zinc and copper. The complexing compound is said to react with the oxide coating and form an insoluble and chemically stable complex with the underlying metal. The pH of the baths containing the complexing compound is typically 8.4, though a pH range of 7-10 is mentioned. The baths contain borate ions. The present inventors have found that with aluminium, at such pH levels and with borate ions present, highly dense, bright thin layers are not produced.

SUMMARY OF THE INVENTION

The object of the invention is therefore to provide an improved thin corrosion-resistant layer on aluminium or aluminium alloy, particularly thin layers of aluminium or aluminium alloy.

The present inventors have surprisingly found that a very thin, smooth, dense barrier-type layer can be formed on an aluminium or aluminium alloy surface under certain conditions. The existence of such a layer, and its highly effective protection of the aluminium against corrosion by moisture, has not apparently been realised or suspected.

According to the invention in one aspect, there is provided a body made of metal selected from aluminium and aluminium alloy having a corrosion-resistant bright dense barrier-type protective layer at a surface thereof, which layer has a thickness in the range 50 to 500 nm and comprises aluminium oxide and a chelate complex of aluminium and at least one organic chelating compound. It is to be particularly noted that this protective layer is bright. Its brightness results from its denseness and its thinness. It preferably has a reflectance of at least 80% or even at least 90%.

The invention is especially useful when the body is a thin film having a thickness in the range of 0.05 to 10 μm and carried on a substrate.

The protective layer is very thin, preferably 50 to 200 nm, and is dense and of barrier-type i.e. it is non-porous. Thus it is different from the conventional thick porous protective layers formed by electrolytic processes at pH<1. The protective layer comprises both aluminium oxide and a chelate complex of aluminium and at least one organic chelating compound. The presence of both these components is essential, in combination with the thinness of the layer, to achieve the bright dense barrier-type layer. Preferably, the protective layer contains Al-O-Al bonding and the term "aluminium oxide" is meant here to include structures having such bonding, not only molecular $Al_2O_3$.

Preferably the chelate complex is a complex of aluminium with at least one organic compound selected from 8-hydroxyquinoline (oxine)
derivatives of 8-hydroxyquinoline
N-nitrosophenyl-hydroxylamineammonium (cupferron)
aminophenols
carboxylic acids and their salts
alizarin
derivatives of alizarin
ethylenediamine tetraaceticacid
sulpho-salicylic acid
α-amino acids
β-diketones, and
chelating agents based on naphthalene, e.g.
  2,3-dihydroxynaphthalene
  2-hydroxy-3-carboxynaphtalene
  diaminonaphthalene
  1-(2-thenoyl)-3,3,3-trifluoroacetone
  benzylacetone
  5-phenyltropolone.

In this invention, a barely soluble or insoluble complex compound is created on the aluminium surface by forming a chelate bond, which has a far stronger bonding force than does aluminium. Important is the stability constant of the aluminium chelate.

It is thought that high corrosion resistance and superior light reflection is obtained for the following reasons.

Oxine takes a phenol type in acidic solution and reacts with aluminium, substituting H of its hydroxy group, and forms a coordination bond with N to form Al-oxinechelate, which includes a five-membered ring. Oxine takes quinine type in alkaline solution, and the aluminium can make a bond with N and a coordination bond with O again to form Al-oxinechelate with a five-membered ring.

Al-oxinechelate formed in this way is thus stable in various corrosive environments. It bonds tightly with the aluminium material, protecting it and giving it high corrosion resistance.

While aqueous solutions of the chelating agent are preferred, when an organic solvent like alcohol is used instead of aqueous solution, corrosion resistance will be exhibited. Use of alcohol can mean that there is no water in the treatment solution, and residual water after-treatment is practically eliminated. Moreover, since organic substances dissolve easily into organic solvents when a volatile solvent is used, the solution may be easier to prepare.

Aluminium exhibits uniform light reflection of about 90% or even higher from ultraviolet up to infrared frequencies. When subjected to surface treatment, aluminium usually suffers remarkable degradation in light reflection, down to 50% or less, because of the protective film formed on the surface. However, when aluminium is treated according to the present invention, in many embodiments the treated surface will reflect light almost as well as an untreated surface.

In one embodiment, the invention provides an information recording member, e.g. a disc, comprising a substrate, a film of metal selected from aluminium and aluminium alloy on said substrate, and on said film a corrosion-resistant bright dense barrier-type protective layer which has a thickness in the range 50 to 500 nm and a reflectance of at least 90% preferably more than 95% and comprises aluminium oxide and a chelate complex of aluminium and at least one organic chelating compound. The metal film preferably has a thickness in the range 0.05 to 5 $\mu$m.

In another embodiment, the invention is applied to an electronic device having a film of metal constituting one of a wiring layer and an electrode layer, said metal being selected from aluminium and aluminium alloy, and on said film a corrosion resistant bright dense barrier-type protective layer which has a thickness in the range 50 to 500 nm and comprises aluminium oxide and a chelate complex of aluminium and at least one organic chelating compound. In this case the metal preferably has a thickness in the range 0.05 to 10 $\mu$m.

The electronic device may be a semiconductor device or may be an electrolytic capacitor with the film being an electrode.

The invention further consists in a method of providing corrosion resistance to a body which is to be exposed to a water-containing environment, said body being made of metal selected from aluminium and aluminium alloy, comprising the step of providing on a surface of said body a corrosion-resistant protective layer as described above.

Several methods, all having various features in common, may be employed to form the novel protective layer of the invention. They may be summarized as firstly a method involving oxidative electrolytic treatment in a solution containing the chelating compound, secondly a method involving contacting the aluminium or aluminium alloy with a solution of the chelating compound and thereafter performing oxidative electrolytic treatment and thirdly a non-electrolytic treatment using a solution of certain chelating compounds. Common features are that the pH of the solution containing the chelating compound is in the range 2 to 7, preferably 2 to 5, more preferably 3 to 5, and that the electrolysis is performed in a solution containing sulphate and/or phosphate (including condensed phosphates) but excluding borate. Optionally other anions may be present. The pH range 2 to 5 in particular produces very dense bright corrosion-resistant layers. The concentration of the chelating agent should be chosen so as to achieve the desired protective layer and is preferably in the range $10^{-5}$ to $10^{-1}$ mol/l.

In more detail, the invention comprises a method of providing a corrosion-resistant layer on a body made of a metal selected from aluminium and aluminium alloy, comprising the step of subjecting a surface of said body to an oxidative electrolytic treatment in an aqueous solution having a pH in the range 2 to 7 containing at least one anion selected from the group comprising sulphate, phosphate and condensed phosphates but from which borate ions are essentially absent and further containing at least one organic chelating agent capable of complexing aluminium, so as to form on said surface said corrosion-resistant layer in the form of a bright dense barrier-type protective layer which has a thickness in the range 50 to 500 nm and comprises aluminium oxide and a chelate complex of aluminium and at least one organic chelating compound.

Preferably the temperature of said solution is in the range 40° to 100° C., more preferably in the range 60° to 80° C.

In another aspect, the invention comprises a method of providing a corrosion resistant layer on a body made of a metal selected from aluminium and aluminium alloy, comprising the steps of (a) contacting a surface of said body with an aqueous solution having a pH in the range 2 to 7 of an organic chelating agent capable of complexing aluminium, and (b) after step (a), subjecting said surface to an oxidative electrolytic treatment in an aqueous solution having a pH in the range of 2 to 7, containing at least one anion selected from the group comprising sulphate, phosphate and condensed phosphate but from which borate ions are essentially absent, said steps (a) and (b) in combination being carried out so as to form on said surface said corrosion-resistant layer in the form of a bright dense barrier-type protective layer which has a thickness in the range 50 to 500 nm and comprises aluminium oxide and a chelate complex of aluminium and at least one organic chelating compound.

In this case, preferably the aqueous solution of step (a) has a temperature in the range 40° to 100° C., more preferably 70° to 100° C. The organic chelating agent of step (a) may also be present in said aqueous solution of step (b).

A third method of the invention consists in providing a corrosion-resistant layer on a body made of a metal selected from aluminium and aluminium alloy, comprising the step of non-electrolytically contacting a surface of said body with an aqueous solution having a pH in the range 2 to 7 of an organic chelating agent capable of chelating aluminium to form an insoluble chelated aluminium compound, which compound has a stability constant of at least 5, so as to form on said surface said corrosion-resistant layer in the form of a bright dense barrier-type protective layer which has a thickness in the range 50 to 500 nm and comprises aluminium oxide and a chelate complex of aluminium and at least one organic chelating compound. The temperature of the aqueous solution is preferably in the range 40° to 100° C., more preferably at least 70° C.

The stability constant of the chelated aluminium compound is preferably at least 15. The organic chelating agent is preferably one of
8-hydroxyquinoline
derivatives of 8-hydroxyquinoline
N-nitrosophenyl-hydroxylamineammonium.

Stability constants of the aluminium chelate complexes of six chelating agents useful in the present invention are as follows:

| | |
|---|---|
| sulpho-salicylic acid | 13.2 |
| EDTA | 16.1 |
| acetylacetone | 8.6 |
| oxine | 32.3–29.0 |
| cupferron | 18.6 |
| sodium benzoate | 1.4 |

This third method, involving non-electrolytic treatment with the chelate solution, produces good protective films of the desired barrier-type, but less dense than the films produced in the methods involving electrolysis. It is important to produce an insoluble film, for which reason the stability constant of the chelated aluminium compound is specified above. The stability constant is $-\log_{10}K$, where K is the solubility product of the chelated compound. In the case of oxine, this compound is the tri-chelate.

Scanning electron microscopy (SEM) has shown that the composition of the protective film produced varies significantly with the pH of the chelating compound solution. With increasing pH, the chelated aluminium complex only tends to be produced, particularly above pH7. Although this complex provides corrosion resistance, at pH above 7 it is not useful because the protective layer must be thick, in order to give the desired protection and because the layer is not bright. Thus the appearance of the surface of the aluminium is marred. The present invention therefore lies in the bright, dense, very thin layers which can be formed at pH 2 to 7. These layers contain both aluminium oxide and the chelate complex. Particularly below pH 5, an interconnecting structure of aluminium oxide and chelating compound is formed, which has high density and very good barrier properties even when very thin.

In the oxidative electrolysis used in some methods of the invention, typically the aluminium or aluminium alloy body is the anode and a Pt cathode is employed. Stirring is necessary. Current density may be in the range 0.1 to 10 mA/cm$^2$, Preferably 1–3 mA/cm$^2$. Applied voltage may be 1 to 20 V, preferably 5 to 10 V. The preferred temperature is 40° to 100° C., more preferably 60° to 80° C.

The body treated may be substantially pure aluminium, or may be an aluminium alloy, i.e. having at least 50% by weight of aluminium Preferred alloying elements are Si, Cu, Pd and Mg, and typically in total up to 10% of these are present in aluminium used in electronic devices. Particular preferred alloys are Al-Si, Al-Cu-Si and Al-Pd-Si.

In the processes of the invention, the 4 nm thick oxide layer which forms on aluminium immediately on exposure to air need not be removed prior to the treatment with the solution of chelating compound.

EXAMPLES

The present invention will now be illustrated by non-limitative examples and comparative examples and with reference to the accompanying drawings. In the drawings:

FIGS. 11a to 11c show three SEMs of protective layers formed on aluminium at various pH levels.

In the Examples, if not specifically stated, the thicknesses of the protective layers formed according to the invention were in the range 50–500 nm. In electrolytic processes, stirring was employed.

EXAMPLE 1

The following test was conducted at several pH levels of the oxine solution.

A 99.99% aluminium plate (area: 10 cm$^2$) was electropolished in an acetic acid-perchloric acid bath, washed with water and dried. The specimen was immersed in an aqueous solution containing 0.001 mol/l oxide at room temperature and 80° C. with its pH value adjusted as desired for 10 min. The specimen was then washed with water and dried. The treated specimen was subjected to room temperature and 80° C. with its pH value adjusted as desired for 10 min. The specimen was then washed with water and dried. The treated specimen was subjected to corrosion test by immersion in a 3% aqueous salt solution at 80° C. for 200 hr. The results ar shown in FIG. 1.

Figure 1:
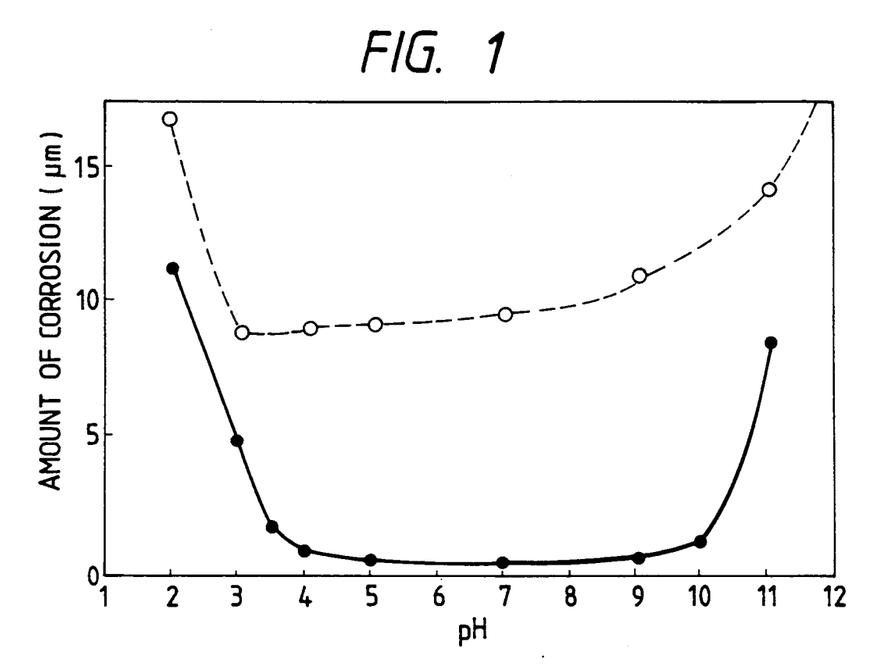
FIG. 1 is a graph showing corrosion levels of aluminium against pH, with and without oxine treatment.

For comparison, results of a similar corrosion test conducted on a specimen subjected to treatment with solution containing no oxine is shown in FIG. 1 by the broken lines. FIG. 1 is a diagram showing levels of corrosion for aluminium subjected to the treatment using oxine at various pH values. The amount of corrosion ($\mu$m, ordinate) is shown as a function of pH value (abscissa). As is apparent from FIG. 1, the aluminium subjected to treatment with oxide at pH values between 3 and 10.0 exhibits low levels of corrosion. For reasons explained above, this invention is restricted to below pH 7.

EXAMPLE 2

Aluminium specimens similar to those used in Example 1 were treated by immersion in a treatment bath containing 0.0015 mol/l oxine at 80° C. for 20 min. The pH value was adjusted to 4.0. Corrosion tests were performed as in Example 1. Denoting the reflection rate of aluminium before treatment as 1, the reflection rate of the specimens after the treatment and after the corrosion test are shown in Table 1. For comparison, the reflection rate of an untreated specimen and specimens subjected to two conventional surface treatments (anode oxidation in sulphuric acid, and treatment with benzenetriazol) are also shown in the table.

TABLE 1

| No. | Classification | Method of surface treatment | Light reflection rate after treatment | Light reflection rate after corrosion test |
| --- | --- | --- | --- | --- |
| 1 | Present invention | Treatment using oxine | 0.95 | 0.92 |
| 2 | Comp. Ex. | Anode oxidation | 0.50 | 0.25 |
| 3 | Comp. Ex. | Treatment using benzotriazol | 0.40 | 0.20 |
| 4 | Comp. Ex. | No treatment | — | 0.15 |

As is apparent from Table 1, the aluminium subjected to the oxine treatment of this invention exhibits high reflection, i.e. 0.9 or more times the reflection value before treatment. This means that little change is observed in light reflection for the treated aluminium, even after the corrosion test. Thus the degradation in reflection is very small. On the other hand, aluminium subjected to conventional treatments, such as those using anode oxidation with sulphuric acid as an electrolyte solution, or benzotriazol, exhibit a far smaller light reflection value after the treatment and after the corrosion test compared to the aluminium subjected to the oxine treatment of this invention.

EXAMPLE 3

An example of the present invention applied to an information disc will now be described with reference to FIG. 2.

An Al-reflection film 2 was deposited to a thickness of 1 μm on the plastics substrate 1 of a stamper, which had been prepared by photoetching and nickel plating. Using the method of this invention, after deposition the film 2 was treated for 10 min. at 80° C. in a 0.001 mol/l oxine solution with its pH value adjusted to 4. This treatment formed an Al-oxinechelate compound film 3 on the Al film 2. A sandwich disc with adhesive 4 was assembled with material subjected to the above treatment. For comparison, another disk was also manufactured in the same way but with untreated material.

The discs were kept for 1000 hrs. at 60° C. and a relative humidity of 95%. They were monitored for the rate of noise appearance. The results are shown in Table 2.

TABLE 2

| | Method of surface treatment | Snow noise appearance rate (%) |
| --- | --- | --- |
| Present invention | Method of surface treatment using oxine | 0.5 |
| Conventional method | No treatment | 9.0 |

As is apparent from Table 2, compared to the product manufactured by a conventional method, the optical memory medium manufactured by the method of the present invention exhibits a far lower noise appearance rate and remarkably improved moisture resistance.

See Example 12 below for another treatment of an optical memory disc.

EXAMPLE 4

A 99.99% aluminium plate (area: 10 cm$^2$) was electropolished in an acetic acid-perchloric acid bath, washed with water and dried to prepare a specimen. The specimen was subjected to an oxidative electrolytic treatment at 80° C. and 10 V for 10 min in a phosphate solution containing 0.01 mol/l of 8-hydroxyquinoline (oxine) with its pH value adjusted to 4. After completion of the electrolytic treatment, the specimen was immersed in a 3% aqueous salt solution at 80° C. and subjected to a corrosion test 200 hr after the initiation of the immersion. The test results are shown in Table 3. For comparison, a specimen subjected to the same surface treatment as that described above in a phosphate solution free from oxine and a specimen not subjected to any surface treatment were given the same corrosion test and the results are also shown in Table 3.

TABLE 3

| No. | | Method of anticorrosive surface treatment | Amount of corrosion after 200 hr (μm) |
| --- | --- | --- | --- |
| 1 | Present invention | Electrolytic treatment in phosphate solution containing oxine | 0.1 |
| 2 | Comp. Ex. | Electrolytic treatment in phosphate solution | 3.8 |
| 3 | Comp. Ex. | No treatment | 11.5 |

As is apparent from Table 3, aluminium subjected to electrolytic treatment in a phosphate solution containing 8-hydroxyquinoline according to the present invention exhibited a much smaller amount of corrosion than that of aluminium not subjected to any treatment or aluminium subjected to electrolytic treatment without oxine.

EXAMPLE 5

A 0.5 μm-thick aluminium coating was subjected to treatment at 80° C. and 10 V according to the present invention, i.e. in a phosphate solution containing 0.01 mol/l of oxine with the pH value adjusted to 4. For comparison, a thin aluminium coating was subjected to the same treatment as that described above in a sulphuric acid solution (pH<1) containing oxine. The coating thickness of these thin coatings before the surface treatment and the thickness and corrosion resistance 10 min and 30 min after the initiation of the electrolytic treatment were examined. The test results are shown in Table 4.

TABLE 4

| | | Before treatment | Treatment for 10 min | Treatment for 30 min |
| --- | --- | --- | --- | --- |
| Present | Thickness | 0.50 | 0.47 | 0.42 |

TABLE 4-continued

| | | Before treatment | Treatment for 10 min | Treatment for 30 min |
|---|---|---|---|---|
| invention (pH 4) | (μm) | | | |
| | Corrosion resistance | x | o | o |
| Comparative Example (sulphuric acid) | Thickness (μm) | 0.50 | 0.24 | 0.09 |
| | Corrosion resistance | x | o | □ |

In Table 4, o indicates good corrosion resistance, and D indicates poor corrosion resistance.

As is apparent from Table 4, the electrolytic treatment in a phosphate solution containing oxine according to the present invention exhibited substantially only slow reduction in the coating thickness after the initiation of the surface treatment and the product had excellent corrosion resistance. On the other hand, the electrolytic treatment in a sulphuric acid solution containing oxine caused rapid decrease in the thickness of the thin aluminium coating due to vigorous generation of hydrogen. These results substantiate that the present invention is very useful for anticorrosive surface treatment of a thin aluminium coating, since only a small thickness of Al is needed to form the protective film.

EXAMPLE 6

Figure 3:
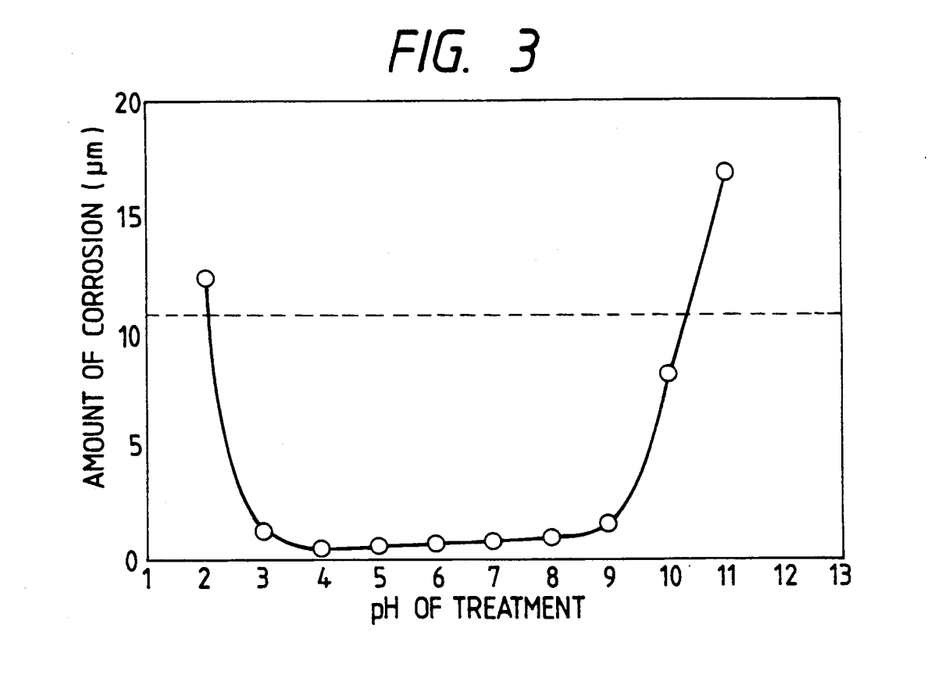
FIG. 3 is another graph showing corrosion levels against pH.

Aluminium specimens the same as that use in Example 5 were subjected to electrolytic treatment in a phosphate solution containing 0.01 mol/l of oxine and having various pH values. The treated specimens were then subjected to a corrosion test in a 3% aqueous salt solution at 80° C. for 200 hr. The results are shown in FIG. 3, which gives the results of the corrosion test after the electrolytic treatment against pH. The circles and the full line represent the amount of corrosion of aluminium treated with electrolytes having particular pH values, while the broken line represents the amount of corrosion of aluminium not subjected to any treatment. As is apparent from FIG. 3 the adjustment of the pH value to 3 to 9 remarkably suppresses the occurrence of corrosion. As already explained, for other reasons, the present invention is restricted to below pH 7.

EXAMPLE 7

Figure 4:
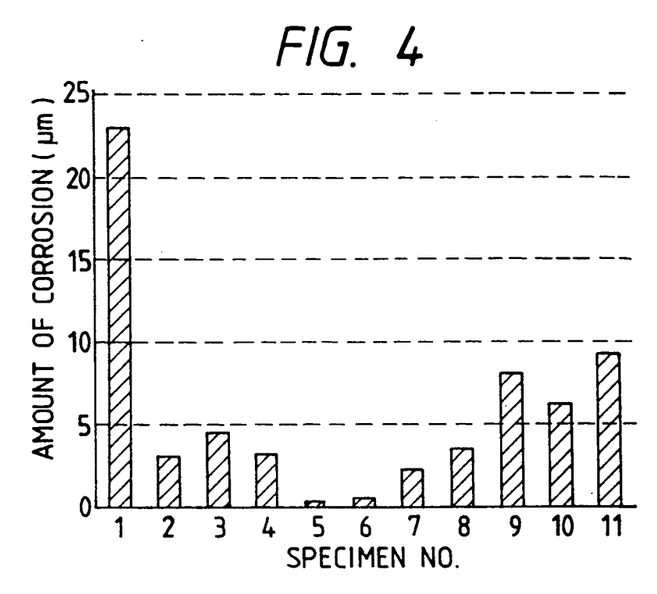
FIG. 4 is a bar chart showing the effectiveness in the invention of various chelating compounds of products of the invention.

Specimens as used in Example 5 were treated electrolytically at 80° C. and 10 V for 10 min in phosphate solutions containing 0.001 mol/l of various organic chelating agents with pH value adjusted to 4. The treated specimen was tested by immersion in a 3% aqueous salt solution for 500 hrs. Measurements of the resulting corrosion are shown in FIG. 4 which lists the chelating agents. For comparison, the corrosion of a specimen not subjected to any surface treatment is also shown in FIG. 4. The specimens subjected to the treatment with an organic chelating agent exhibited less corrosion than did the untreated specimen. This shows that aluminium corrosion is suppressed by the treatment of the present invention. The specimens subjected to treatment with oxine and N-nitrosophenyl-hydroxylamineammonium (cupferron) especially exhibited especially small amounts of corrosion; the treatment had a high corrosion-suppressing effect for the aluminium.

EXAMPLE 8

Figure 5:
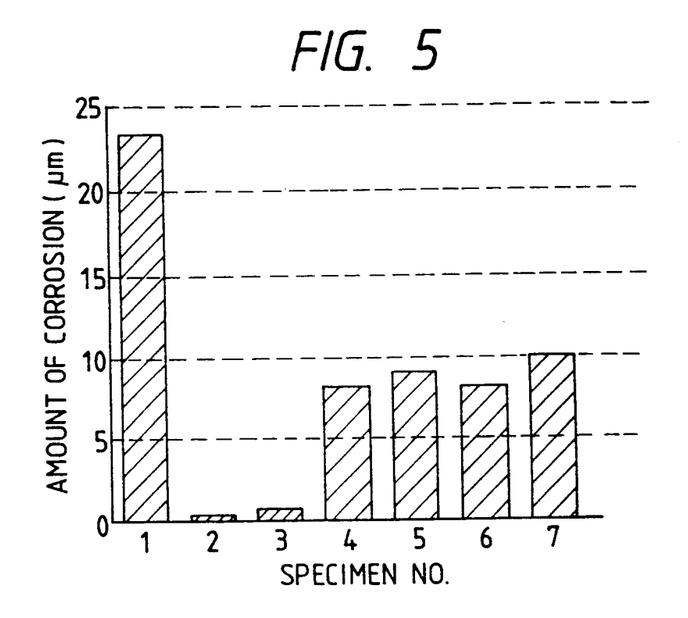

Specimens as used in Example 5 were treated electrolytically at 10 V for 10 min in electrolytic solutions of pH 4 containing 0.01 mol/l of oxine and various different anions. The treated specimen was tested by immersion in a 3% aqueous salt solution for 500 hrs. The measurements of the resulting corrosion are shown in FIG. 5 with the result for an untreated specimen. The amount of corrosion is lessened and depends upon the kind of electrolyte solution employed. The treatments with phosphate and sulphate solutions especially decrease corrosion.

EXAMPLE 9

Figure 6:
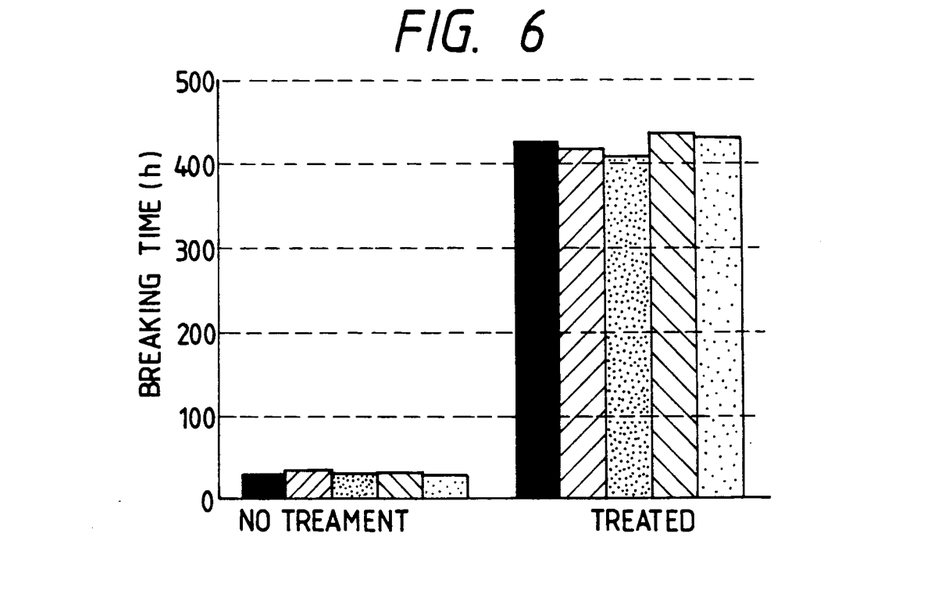

On a silicon wafer with a thermal oxidation film 0.5 μm thick, aluminium thin film was deposited by sputtering Al-2% Si (aluminium alloyed with 2% Si by weight) to a thickness 0.8 μm. Patterning was applied to the thin aluminium film to create 2 μm width stripe wiring. This specimen was treated electrolytically for 5 min at 80° C. and a constant voltage of 5 V in a sulphate solution containing 0.01 mol/l of cupferron with a pH value of 4. The wiring of the specimen was attached to lead wires at both ends, and then immersed in a 3% aqueous salt solution. The aluminium wiring was monitored for its electrical resistance. The wire-breaking time was defined as the time between initial immersion and a surge in the aluminium wire's resistance. FIG. 6 shows wire breaking times obtained for five such samples and for comparison, the results of the same test conducted on untreated aluminium samples. As is apparent from FIG. 6, the aluminium subjected to the treatment of this invention exhibits wire breaking times ten times longer than for the untreated aluminium.

EXAMPLE 10

Figure 7:
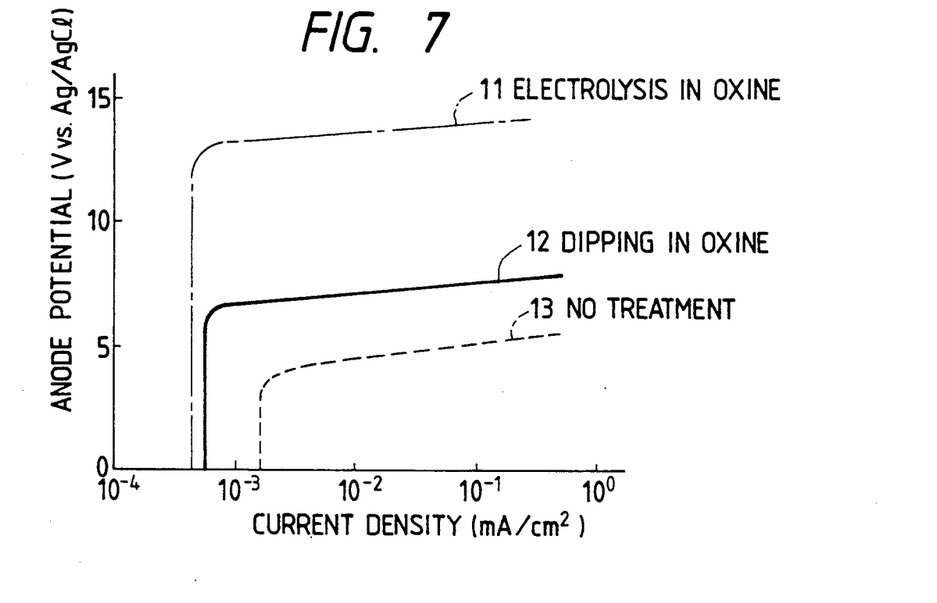
FIG. 7 is a graph of anode potential against current density.

A specimen the same as used in Example 1 was treated electrolytically at 80° C. and a constant voltage of 10 V for 10 min in a 0.1 mol/l phosphate solution containing 0.01 mol/l of oxine and with pH 4. A similar specimen wa subjected to treatment without electrolysis, at 80° C. for 20 hr immersed in a 0.01 mol/l oxine solution of pH 4. The specimens after the treatment were immersed in a 3% aqueous salt solution, then polarized from the immersion potential to the anodic direction t evaluate the withstand voltage of the films. For comparison, similar measurements were conducted on a specimen not subjected to any surface treatment. The results are shown in FIG. 7. The specimen not subjected to surface treatment showed a sudden rise in current at a voltage around 4V. This indicates the breaking of the protective oxide film However, the aluminium subjected to immersion treatment in an oxine solution showed no breaking of the protective film until the voltage reached 7V, while the specimen subjected to electrolytic treatment in an oxine solution showed a very high withstand voltage of 13 V. A stable film which suppresses corrosion can be produced with treatment in an oxine solution and a better film is produced by the electrolytic treatment.

EXAMPLE 11

A specimen as used in Example 5 was subjected to an electrolytic treatment at 80° C. and at constant voltage of 10 V for 10 min in a 0.1 mol/l phosphate solution containing 0.01 mol/l oxine solution with pH value adjusted to 4. A corrosion test was performed as in the above Examples. The light reflection rate of the specimen after the treatment and after the corrosion test are shown in Table 5 which denotes the reflection rate of the specimen before the treatment as 1. For the comparison, the reflection rate for an identical specimen not subjected to any treatment and for an identical specimen subjected to treatment in strong sulphuric acid and oxine (0.01 mol/l ) are also shown in Table 5. The specimen subjected to the treatment of the present invention shows its reflection rate almost unchanged after treatment as well as after corrosion test, compared to the other specimens.

TABLE 5

| No. | | Method of surface treatment | Reflection rate after treatment | Reflection rate after corrosion test |
| --- | --- | --- | --- | --- |
| 1 | Present invention | Oxine + phosphate (pH 3, 80° C., 10 V, 10 min) | 0.98 | 0.95 |
| 2 | Comp. Ex. | Oxine + sulphuric acid (80° C., 10 V, 10 min) | 0.20 | 0.11 |
| 3 | Comp. Ex. | No treatment | 1.0 | 0.10 |

EXAMPLE 12

Figure 2:
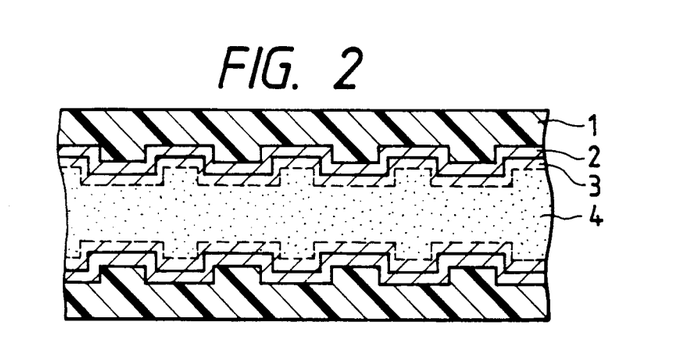
FIG. 2 is a diagrammatic sectional view of an information disc embodying the present invention.

The present invention was applied to an optical-memory medium shown in FIG. 2. Aluminium reflection film was deposited on a plastic surface formed on a stamper, which was created by photoetching and nickel plating. Using the method of this invention, the film was then subjected to an electrolytic treatment at 80° C. and 10 V for 10 min in a phosphate solution of pH 3 containing 0.001 mol/l of oxine. A protective coating 3 was formed on the Al film 2. The protective coating 3 contained aluminium oxide and Al chelate formed by electrolytic treatment. Then, a pair of sheets each consisting of plastic substrate 1, aluminium film 2 and protective coating 3 were assembled to face to face and were bonded by an adhesive 4. A sandwich disc was assembled using films subjected to this treatment. For comparison, another disc was also assembled in the similar process using films not subjected to the treatment. The discs thus assembled were kept at 60° C. and a relative humidity of 95% for 1000 hrs. Then the discs were measured for their noise levels. The results are shown in Table 6. As is apparent from this table, the medium for optical memory which was subjected to the surface treatment according to the present invention exhibits far less noise compared to the optical memory medium manufactured by the conventional method. A remarkable improvement in moisture resistance reliability is achieved.

TABLE 6

| No. | | Method of surface treatment | Noise appearance rate (%) |
| --- | --- | --- | --- |
| 1 | Present invention | Oxine + phosphate (pH 3, 80° C., 10 V, 10 min) | 0.3 |
| 2 | Conventional | No treatment | 9.0 |

EXAMPLE 13

Figure 8:
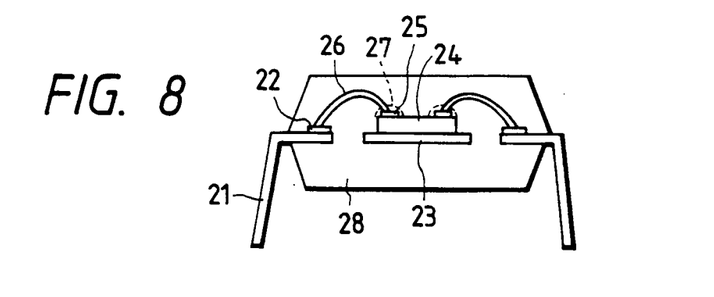
FIG. 8 is a diagrammatic view of an electronic device having wiring embodying the invention.

The invention was applied to a semiconductor device shown in FIG. 8.

A semiconductor chip 24 attached to a tab 23 by die bonding is connected via a primary side electrode 22 plated with Ag and an aluminium secondary side electrode 25, to a portion of a lead frame 21 which is made of Fe-42Ni-alloy or Cu-alloy, by wire bonding using an Au or Cu lead wire 26. Then, the surface of this unit is treated electrolytically by the method of this invention, with lead frames as electric connections. The treatment is conducted at a constant voltage of 10 V for 10 min in 0.1 mol/l sulphate solution (pH 4, 60° C.) containing 0.01 mol/l BTA. A protective layer 27 is created on the Al electrode. To complete the semiconductor unit, the treated unit was sealed with an epoxy sealing resin 28. For comparison, another semiconductor unit was manufactured in the same way, but its surface was left untreated.

The completed semiconductor units were kept in a pressure cooker at 121° C. and at relative humidity of 95%. To measure the time to wire-breaking, they were monitored for defects caused by broken aluminium wiring. The results are shown in Table 7.

As is apparent from Table 7, the semiconductor units 1 to 4, using the method of this invention, are remarkably improved in moisture resistance reliability compared to those manufactured by conventional processes 5 to 8. That is, BTA improves not only on the surface of aluminium wiring but also the surface of Cu lead wires. It creates a stable protective coating and, therefore, enhances corrosion resistance in the units. It also enhances tight adhesion between lead frames and the resin, and so protects inner parts of semiconductors from outside moisture penetration.

This method may also be applied to semiconductors prior to assembly, e.g. the method works on wafers after patterning. Using this simple method of treatment, semiconductor reliability can be enhanced.

TABLE 7

| Manufacturing method | No. | Lead frame | Lead wire | Surface treatment | Life time (h) |
| --- | --- | --- | --- | --- | --- |
| Present invention | 1 | Fe-42Ni-alloy | Cu | Yes | >3000 |
| | 2 | Cu-alloy | Cu | Yes | >3000 |
| | 3 | Fe-42Ni-alloy | Au | Yes | >3000 |
| | 4 | Cu-alloy | Au | Yes | >3000 |
| Conventional method | 5 | Fe-42Ni-alloy | Cu | No | 650 |
| | 6 | Cu-alloy | Cu | No | 450 |
| | 7 | Fe-42Ni-alloy | Au | No | 1800 |
| | 8 | Cu-alloy | Au | No | 1750 |

EXAMPLE 14

An aluminium plate of 99.99% purity was immersed in an aqueous boiling solution of 0.001 mol/l of 8-hydroxyqunoline for 30 minutes and the plate was rinsed with water and dried. The test plate was then subjected to electrolysis in an aqueous solution of an electrolyte of a sulphate at pH 4 and 80° C. for 10 minutes. The voltage was 10 volts. The plate was then tested by immersion in a 3% salt NaCl solution at 80° C. for 200 hours. The corrosion test results are shown in Table 8. In the table there are shown for comparison results for a test piece which was subjected to electrolysis only and for a test piece which was not treated at all.

TABLE 8

| No. | treatment method | amount of corrosion (μm) |
| --- | --- | --- |
| 1 | treatment with 8-hydroxyquinoline followed by electrolysis | 0.2 |
| 2 | electrolysis in sulphate solution | 4.2 |
| 3 | no treatment | 11.5 |

It is apparent that the treatment of the method of the invention exhibits an excellent result.

Figure 9:
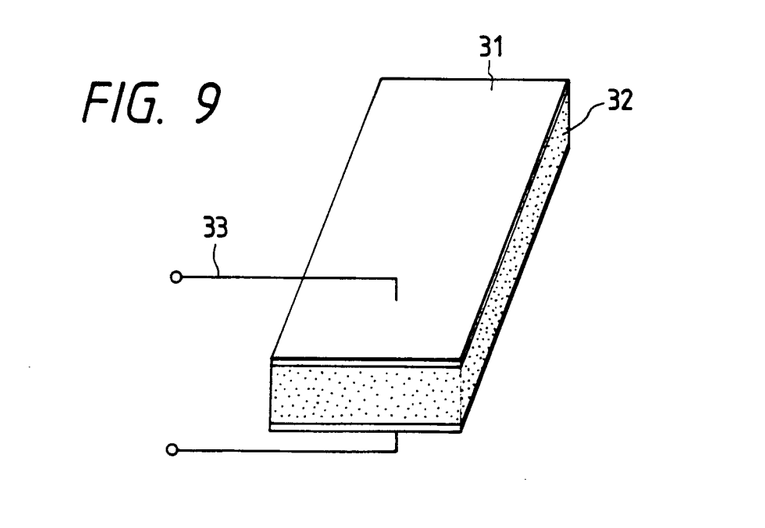
FIG. 9 is a diagrammatic view of an electrolytic capacitor embodying the invention.

FIG. 9 shows an electrolytic capacitor to which the invention is applied. The capacitor has foil electrodes 31 of aluminium on opposite sides of a dielectric layer 32. Lead wires 33 are attached to the electrodes 31. By the invention, an effective anticorrosion protective coating is applied to the foil electrode 31.

Figure 10:
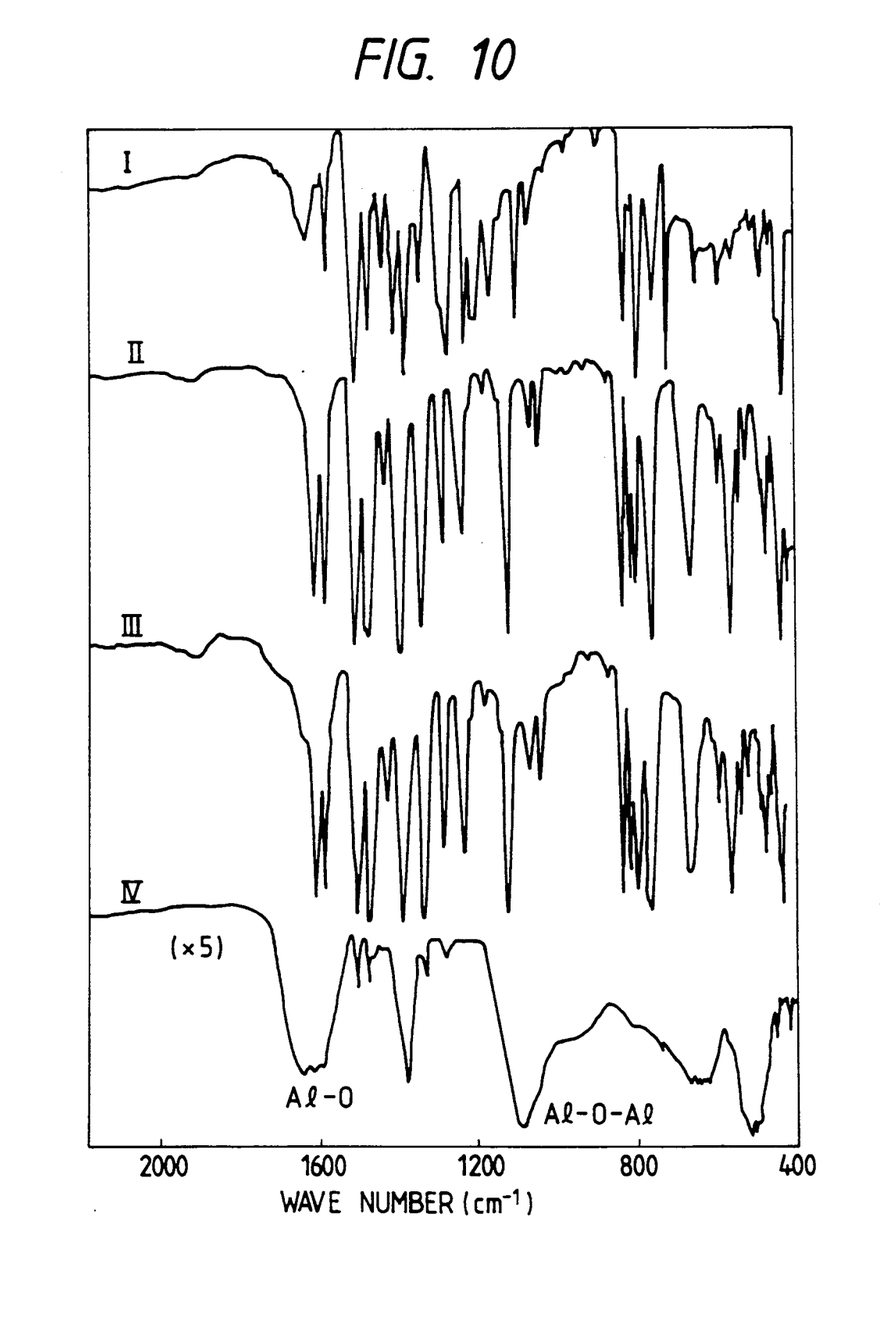
FIG. 10 shows infra-red spectra of oxine, the molecular complex of oxine and Al and two protective layers of the invention.

FIG. 10 shows four IR spectra, of oxine and oxine complexes with aluminium. Spectrum I is that of pure oxine. Spectrum II is that of the pure molecular complex of oxine and aluminium (i.e. the tri-chelate). III is the spectrum of the protective layer formed according to the invention when aluminium is exposed to an oxine solution of pH 7, and is similar to II, showing that at pH 7 predominantly the tri-chelate is formed. IV is the spectrum of the protective layer formed according to the invention when aluminium is exposed to an oxine solution of pH 3. In the case of IV, the spectrum is very different and indicates that Al-O and Al-O-Al bonding is present, i.e. that aluminium oxide, as well as complexes of oxine and aluminium, is formed.

FIGS. 11a to 11c confirm these indications of the IR spectra. FIGS. 11a to 11c show SEMs of the protective layer produced by contact of an aluminium surface with oxine solution of three different pH levels. At pH 3 a layer of smooth, bright, very dense appearance is produced as shown in FIG. 11a. At pH 7, the surface is less smooth in appearance in the SEM and is less dense and may consist largely of crystalline Al/oxine complex (tri-chelate), but is still a relatively bright and dense barrier-type layer as shown in FIG. 11b. At pH 11, the crystalline nature is more apparent as shown in FIG. 11c. The surface is no longer bright, but is grey, and the protective layer is thicker.

What is claimed is:

1. A body made of metal selected from aluminum and aluminum alloy having a corrosion-resistant bright dense protective layer at a surface thereof, which layer has a thickness in the range 50 to 500 nm and comprises aluminum oxide and a chelate complex of aluminum and at least one organic chelating compound selected from the group consisting of 8-hydroxyquinoline, derivatives of 8-hydroxyquinoline and N-nitrosophenyl-hydroxylamineammonium, and having a reflectance of at least 80%.

2. A body according to claim 1 wherein said protective layer has a reflectance of at least 80%.

3. A body according to claim 1 wherein said protective layer has a reflectance of at least 90%.

4. A body according to claim 1 which is a thin film of said metal having a thickness in the range of 0.05 to 10 $\mu$m and carried on a substrate.

5. A body according to claim 1 wherein said protective layer has a thickness in the range 50 to 200 nm.

6. A body made of metal selected from aluminum and aluminum alloy having a corrosion-resistant bright dense protective layer at a surface thereof, which layer has a thickness in the range 50 to 500 nm and comprises aluminum oxide and a chelate complex of aluminum and at least one organic chelating compound selected from the group consisting of 8-hydroxyquinoline, derivatives of 8-hydroxyquinoline N-nitrosophenyl-hydroxylamineammonium, aminophenols, carboxylic acids and their salts, alizarin, derivatives of alizarin, ethylenediamine tetraacetic acid, sulpho-salicyclic acid, $\alpha$-amino acids, $\beta$-diketones, and chelating agents based on naphthalene.

7. A body made of metal selected from aluminum and aluminum alloy having a corrosion-resistant bright dense protective layer at a surface thereof, which layer has a thickness in the range 50 to 500 nm and comprises aluminum oxide and a chelate complex of aluminum and at least one organic chelating compound; said protective layer containing Al-O-Al bonding.

8. An information recording member comprising a substrate, a film of metal selected from aluminum and aluminum alloy on said substrate, and on said film a corrosion-resistant bright dense protective layer which has a thickness in the range 50 to 500 nm and a reflectance of at least 90% and comprises aluminum oxide and a chelate complex of aluminum and at least one organic chelating compound selected from the group consisting of 8-hydroxyquinoline, derivatives of 8-hydroxyquinoline and N-nitrosophenyl-hydroxylamineammonium.

9. An information recording member according to claim 8 wherein said film has a thickness in the range 0.05 to 5 $\mu$m.

10. An electronic device having a film of metal constituting one of a wiring layer and an electrode layer, said metal being selected from aluminum and aluminum alloy, and on said film a corrosion-resistant bright dense protective layer which has a thickness in the range of 50 to 500 nm and comprises aluminum oxide and a chelate complex of aluminum and at least one organic chelating compound selected from the group consisting of 8-hydroxyquinoline, derivatives of 8-hydroxyquinoline and N-nitrosophenyl-hydroxylamineammonium, and having a reflectance of at least 80%.

11. An electronic device according to claim 10 wherein said film has a thickness in the range 0.05 to 10 $\mu$m.

12. An electronic device according to claim 10 which is a semiconductor device.

13. An electronic device according to claim 10 which is an electrolytic capacitor, said film being an electrode thereof.

14. A method of providing corrosion-resistance to a body which is to be exposed to a water-containing environment, said body being made of a metal selected from aluminum and aluminum alloy, comprising the step of providing on a surface of said body a corrosion-resistant bright dense protective layer which has a thickness in the range 50 to 500 nm and comprises aluminum oxide and a chelate complex of aluminum and at least one organic chelating compound selected from the group consisting of 8-hydroxyquinoline, derivatives of 8-hydroxyquinoline and N-nitrosophenyl-hydroxylamineammonium, aminophenols, carboxylic acids and their salts, alizarin, derivatives of alizarin, ethylenediamine tetraacetic acid, sulpho-salicyclic acid, $\alpha$-amino acids, $\beta$-diketones, and chelating agents based on naphthalene, by subjecting a surface of said body to an oxidative electrolytic treatment in an aqueous solution for forming said protective layer and having a pH in the range 2 to 7.

15. A method of providing a corrosion-resistant layer on a body made of a metal selected from aluminum and aluminum alloy, comprising the step of subjecting a surface of said body to an oxidative electrolytic treatment in an aqueous solution having a pH in the range 2 to 7, containing at least one anion selected from the group comprising sulphate, phosphate and condensed phosphates but from which borate ions are essentially absent, and further containing at least one organic chelating agent capable of complexing aluminum, so as to form on said surface said corrosion-resistant layer in the form of a bright dense protective layer which has a thickness in the range 50 to 500 nm and comprises aluminum oxide and a chelate complex of aluminum and at least one organic chelating compound selected from the group consisting of 8-hydroxyquinoline, derivatives of 8-hydroxyquinoline and N-nitrosophenyl-hydroxylamineammonium, aminophenols, carboxylic acids and their salts, alizarin, derivatives of alizarin, ethylenediamine tetraacetic acid, sulpho-salicyclic acid, α-amino acids, β-diketones, and chelating agents based on naphthalene.

16. A method according to claim 15 wherein the temperature of said solution is in the range 40° to 100° C.

17. A method according to claim 16 wherein the temperature of said solution is in the range 60° to 80° C.

18. A method according to claim 16 wherein said body is a film of said metal having a thickness in the range 0.05 to 10 μm carried on a substrate.

19. A method according to claim 15 wherein the pH of said solution is in the range 2 to 5.

20. A method according to claim 15 wherein said organic chelating agent is at least one organic compound selected from the group comprising
8-hydroxyquinoline
derivatives of 8-hydroxyquinoline and
N-nitrosophenyl-hydroxylamineammonium.

21. A method of providing a corrosion-resistant layer on a body made of a metal selected from aluminum and aluminum alloy, comprising the steps of
(a) contacting a surface of said body with an aqueous solution having a pH in the range 2 to 7 of an organic chelating agent capable of complexing aluminum, and
(b) after step (a), subjecting said surface to an oxidative electrolytic treatment in an aqueous solution having a pH in the range of 2 to 7, containing at least one anion selected from the group comprising sulphate, phosphate and condensed phosphates but from which borate ions are essentially absent,
said steps (a) and (b) in combination being carried out so as to form on said surface said corrosion-resistant layer in the form of a bright dense protective layer which has a thickness in the range 50 to 500 nm and comprises aluminum oxide and a chelate complex of aluminum and at least one organic chelating compound, selected from the group consisting of 8-hydroxyquinoline, derivatives of 8-hydroxyquinoline and N-nitrosophenyl-hydroxylamineammonium, aminophenols, carboxylic acids and their salts, alizarin, derivatives of alizarin, ethylenediamine tetraacetic acid, sulpho-salicyclic acid, α-amino acids, β-diketones, and chelating agents based on naphthalene.

22. A method according to claim 21 wherein said aqueous solution of step (a) has a temperature in the range 70° to 100° C.

23. A method according to claim 21 wherein said organic chelating agent of step (a) is also present in said aqueous solution of step (b).

24. A method according to claim 21 wherein said organic chelating agent is at least one organic compound selected from the groups comprising
8-hydroxyquinoline
derivatives of 8-hydroxyquinoline and
N-nitrosophenyl-hydroxylamineammonium.

25. A method of providing a corrosion-resistant layer on a body made of a metal selected from aluminum and aluminum alloy, comprising the step of non-electrolytically contacting a surface of said body with an aqueous solution having a pH in the range 2 to 7 of an organic chelating agent capable of chelating aluminum to form an insoluble chelated aluminum compound, which compound has a stability constant of at least 5, so as to form on said surface said corrosion-resistant layer in the form of a bright dense protective layer which has a thickness in the range 50 to 500 nm and comprises aluminum oxide and a chelate complex of aluminum and at least one organic chelating compound selected from the group consisting of 8-hydroxyquinoline, derivatives of 8-hydroxyquinoline and N-nitrosophenyl-hydroxylamineammonium, aminophenols, carboxylic acids and their salts, alizarin, derivatives of alizarin, ethylenediamine tetraacetic acid, sulpho-salicyclic acid, α-amino acids, β-diketones, and chelating agents based on naphthalene.

26. A method according to claim 25 wherein the temperature of said aqueous solution is at least 70° C.

27. A method according to claim 25 wherein said stability constant is at least 15.

28. A method according to claim 25 wherein said organic chelating agent is selected from the group comprising
8-hydroxyquinoline
derivatives of 8-hydroxyquinoline and
N-nitrosophenyl-hydroxylamineammonium.

29. A method according to claim 25 wherein the pH of said solution is in the range 2 to 5.

* * * * *